United States Patent [19]

Wolter et al.

[11] Patent Number: 4,803,903
[45] Date of Patent: Feb. 14, 1989

[54] POWERED WIRE STRIPPER

[75] Inventors: Eric H. Wolter, Rockford; James A. Wennemar, Sycamore, both of Ill.

[73] Assignee: Ideal Industries, Inc., Sycamore, Ill.

[21] Appl. No.: 97,869

[22] Filed: Sep. 17, 1987

[51] Int. Cl.4 .............................................. H02G 1/12
[52] U.S. Cl. ...................................... 81/9.43; 81/9.51
[58] Field of Search ..................... 81/9.4, 9.41, 9.42, 81/9.43, 9.51

[56] References Cited

U.S. PATENT DOCUMENTS

| | | | |
|---|---|---|---|
| 3,154,980 | 11/1964 | Hayden et al. | 81/9.51 |
| 3,176,550 | 4/1965 | Marcotte | 81/9.51 |
| 3,763,723 | 10/1973 | Oprins | 81/9.43 |
| 3,765,277 | 10/1973 | Sorensen | 81/9.43 |
| 4,072,069 | 2/1978 | Bieganski | 81/9.43 |

Primary Examiner—Roscoe V. Parker
Attorney, Agent, or Firm—Kinzer, Plyer, Dorn, McEachran & Jambor

[57] ABSTRACT

A powered wire stripper in the form of a precision end stripper includes a housing with a wire-receiving opening at one end. An air cylinder and valve are connected to the housing and arranged to drive the stripper components back and forth. Those components include a pair of blade holders pivotable about a pivot pin between open and closed conditions and slidable within the housing between ready and retract positions. A set of precision cutting blades is mounted on the blade holders in opposing relation. A pair of puller plates are slidable in the housing and include a pair of slots disposed at an angle to the axis of motion. Slide pins slidably mounted in the slots pivotally engage the blade holders such that motion of the puller plate causes the blade holders to pivot about the pivot pin.

19 Claims, 5 Drawing Sheets

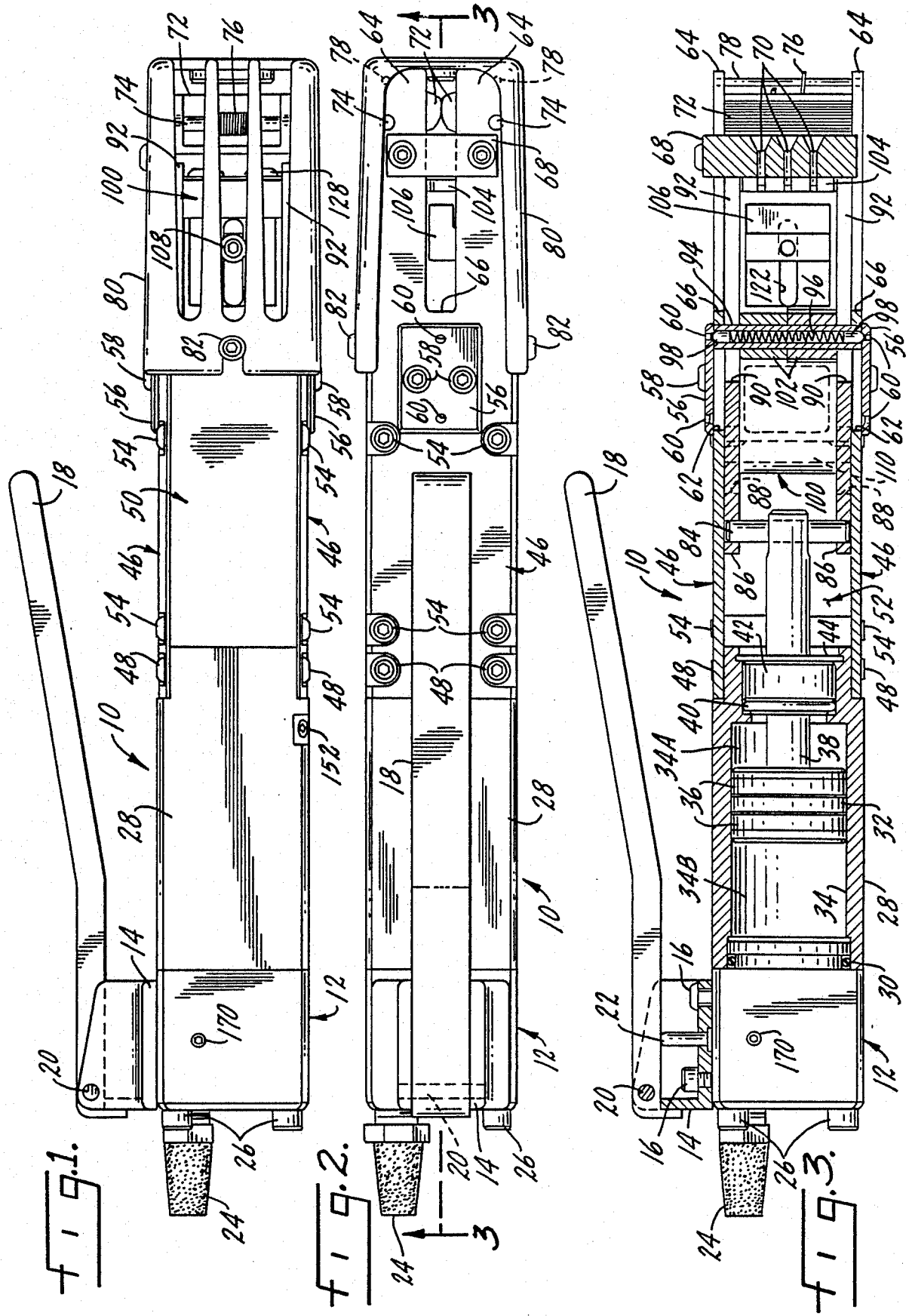

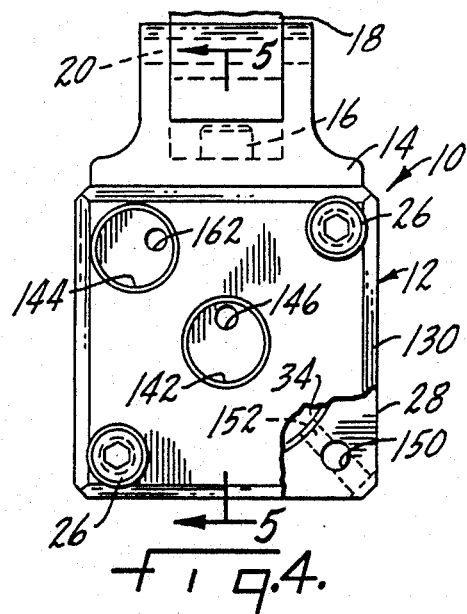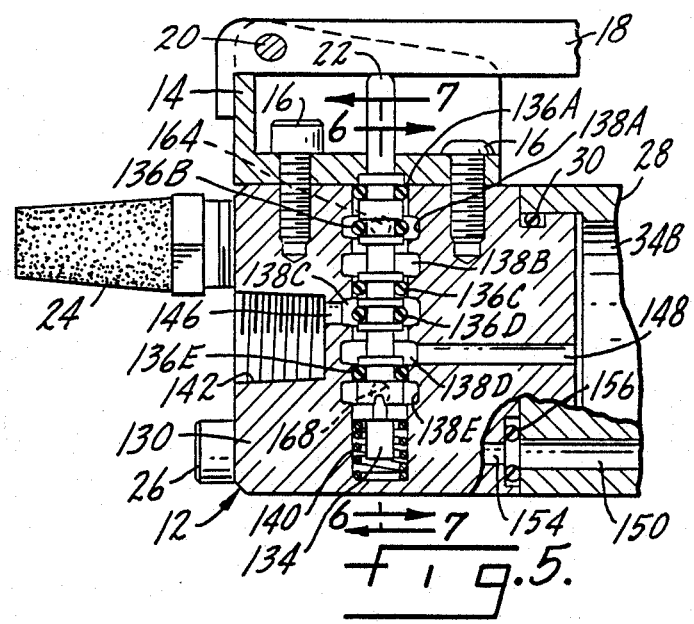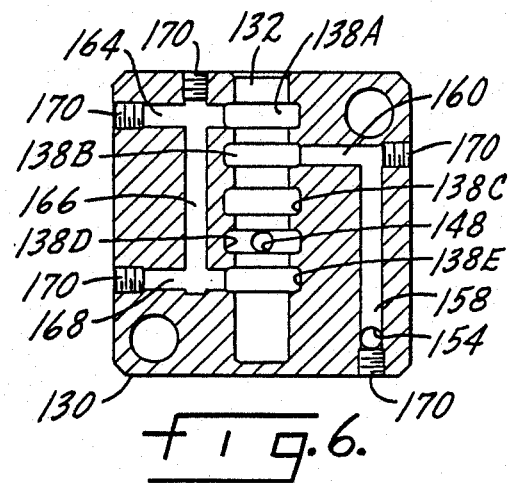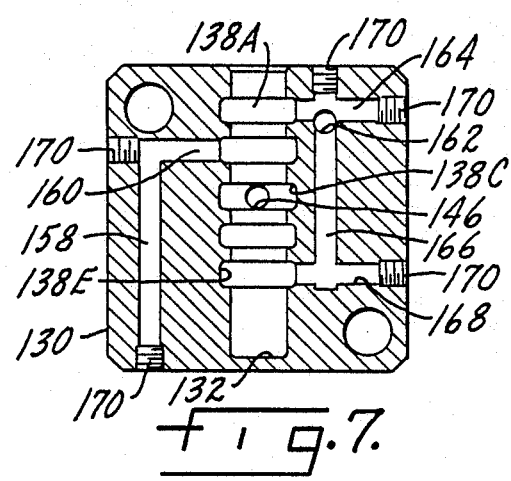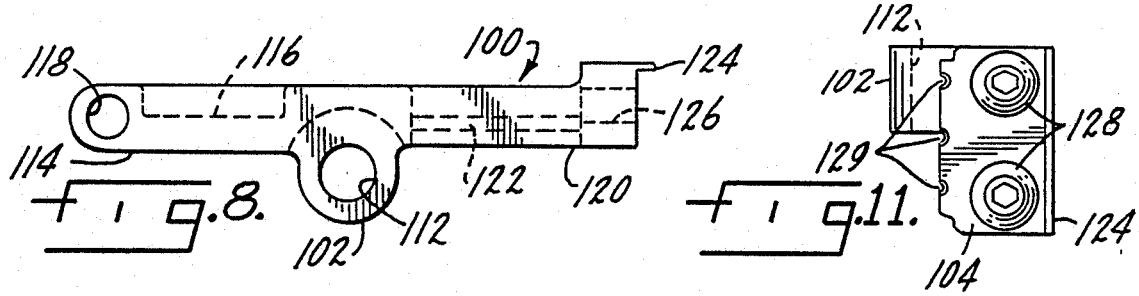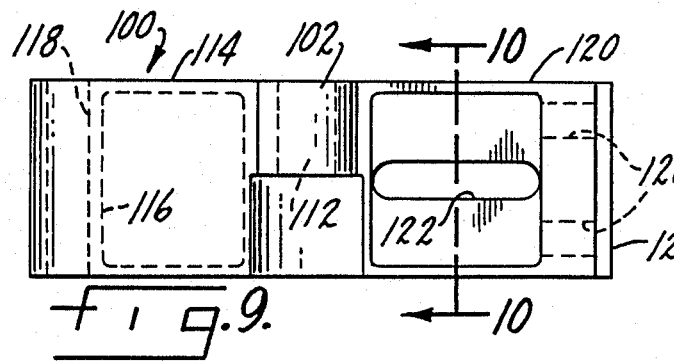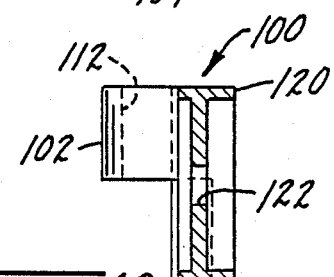

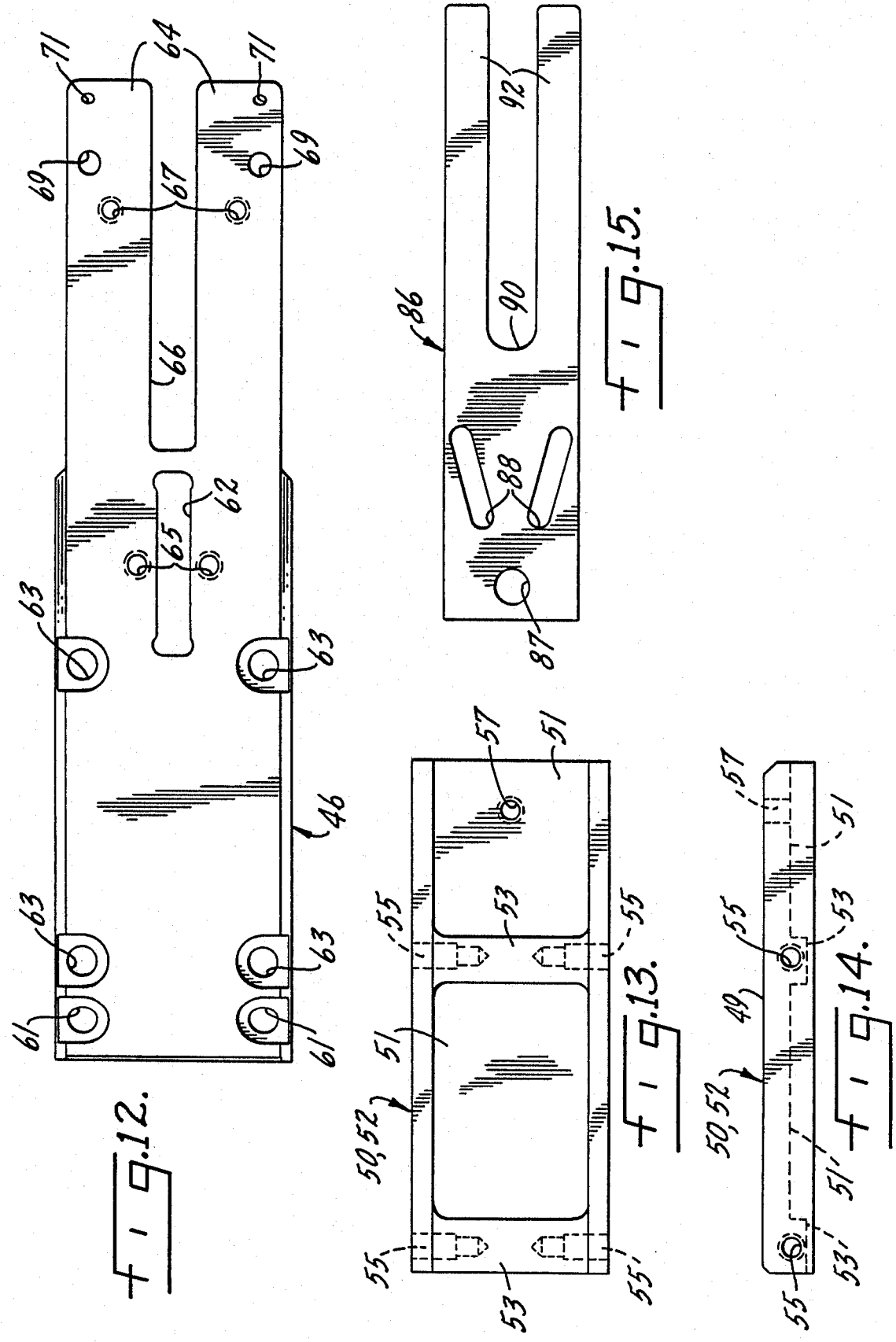

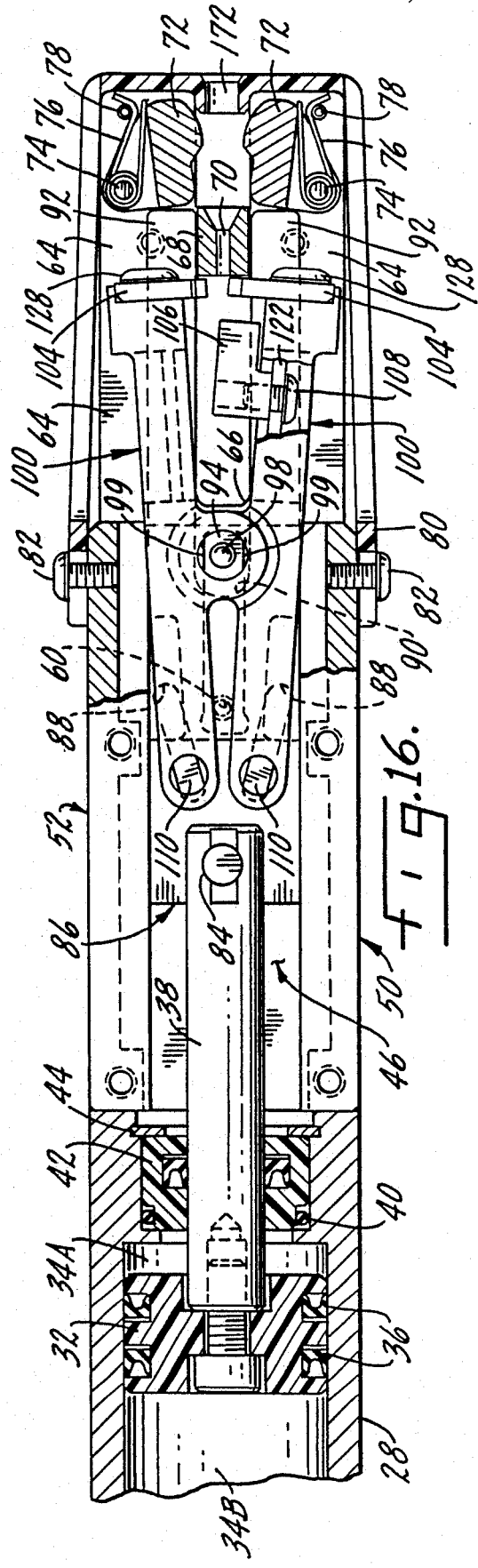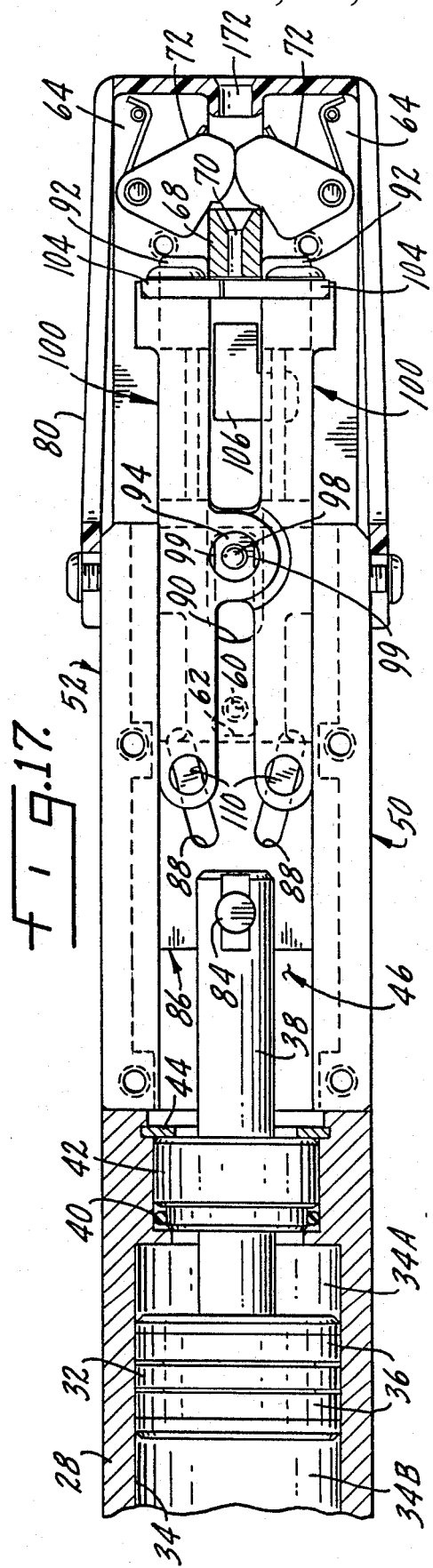

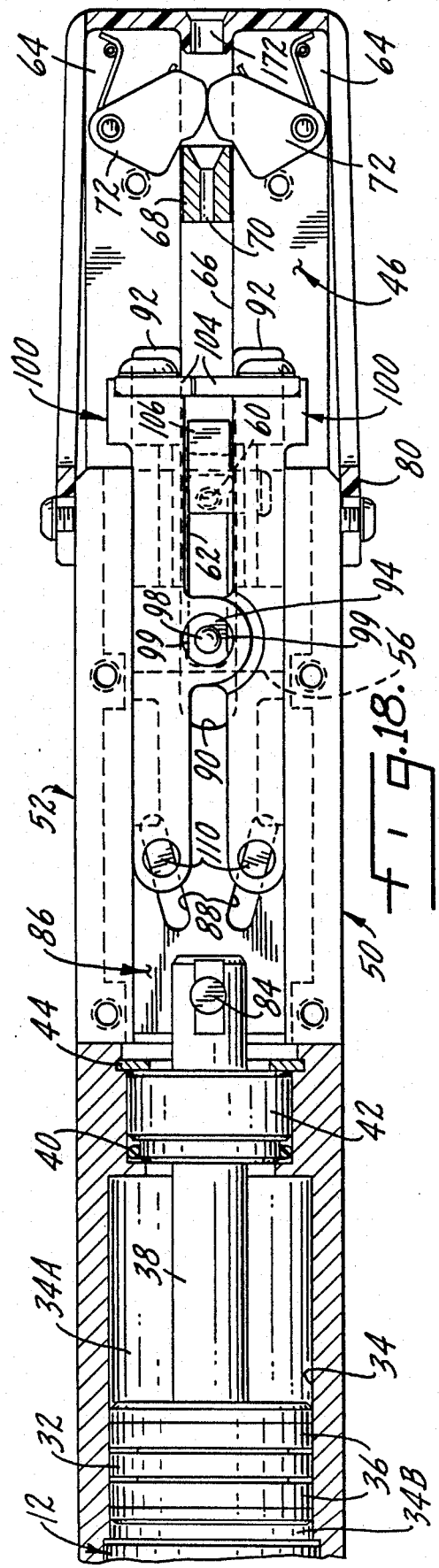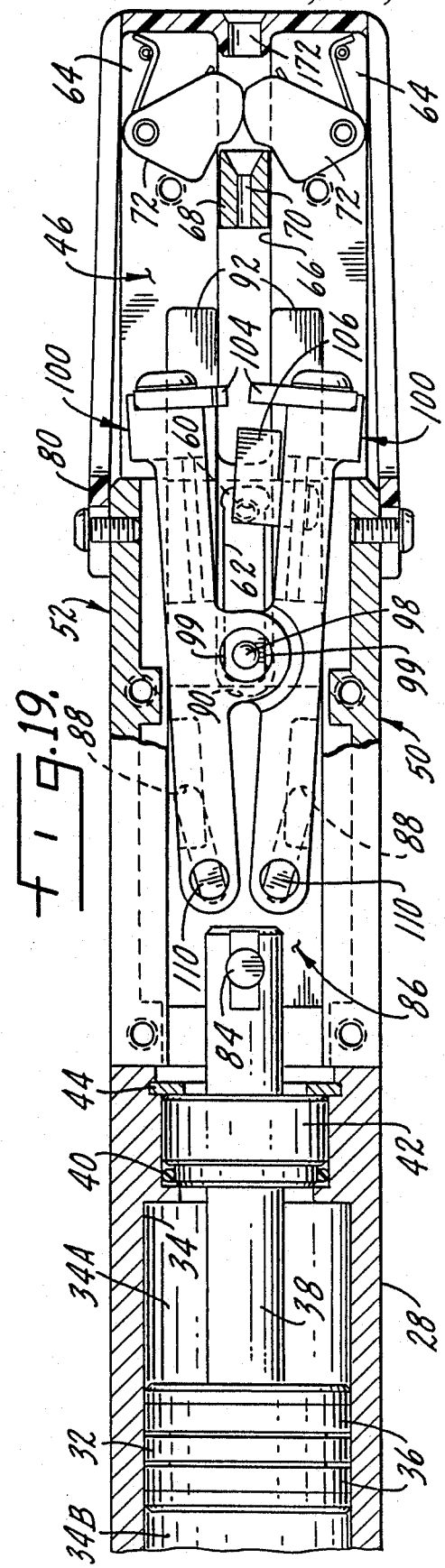

POWERED WIRE STRIPPER

SUMMARY OF THE INVENTION

This invention relates to a powered wire stripper and is particularly concerned with a precision end stripper. The term end stripper is meant to describe a device wherein wires to be stripped are inserted into an end of the machine, parallel to its longitudinal axis. This contrasts with typical powered strippers wherein wires are inserted somewhere along the side of the machine, perpendicular to its longitudinal axis.

Hand-held end strippers are advantageously used in precision, production operations. Stripping from the front end of the tool provides easier operation on form boards. Individual wires can be separated from a bundle of unstripped wires and stripped without having to remove them completely from the bundle. In effect, this allows the stripper to be taken to the wires on the form board, rather than vice versa. End strippers also provide better access to confined spaces.

Some applications require precision wire stripping wherein the electrical conductor is neither nicked nor bent during the removal of an insulation slug. The aerospace industry, for example, typically requires precision stripping. To avoid nicking the wire during cutting of the insulation, precision, die-type blades are used. To avoid bending or marring the exposed conductor during slug removal, a linear motion of the slug removal apparatus, parallel to the axis of the conductor, is required.

The present invention provides these features in a hand-held end stripper. The stripper has an air cylinder for actuating a pair of puller plates which slide in a housing defined by frame and cover pieces. A set of blade holders are pivotable about a pivot pin. The blade holders and pivot pin are also slidable in the housing. The blade holders mount a pair of slide pins which extend through slots formed in the puller plates. The slots are disposed at an angle to the axis of motion so that when the puller plates move, the blade holders are pivoted to either open or close them. At that point, continued motion of the puller plates causes sliding motion of the blade holders and pivot pin.

The pivot pin has a ball plunger which releasably connects the blade holders to the frame so that the pivoting action takes place prior to the sliding action of the blade holders. A pair of grippers are arranged to clamp a wire after it has been inserted into the wire stripper. The grippers are mounted in a guard member which keeps foreign objects out of the interior of the wire stripper. If the guard is removed, the grippers will not function. Thus, the safety afforded by the guard cannot be defeated.

BRIEF DESCRIPTION OF THE DRAWINGS

FIG. 1 is a side elevation view of the wire stripper according to the present invention.

FIG. 2 is a top plan view of the wire stripper.

FIG. 3 is a section taken along line 3—3 of FIG. 2, with the guard removed.

FIG. 4 is an end elevation view of the valve, with portions cut away.

FIG. 5 is a section taken along line 5—5 of FIG. 4.

FIG. 6 is a section taken along line 6—6 of FIG. 5.

FIG. 7 is a section taken along line 7—7 of FIG. 5.

FIG. 8 is a plan view of a blade holder.

FIG. 9 is a side elevation view of a blade holder.

FIG. 10 is a section taken along line 10—10 of FIG. 9.

FIG. 11 is an end view of a blade holder with half of a blade set installed.

FIG. 12 is a plan elevation view of a frame member.

FIG. 13 is a side elevation view of the interior side of a cover.

FIG. 14 is a plan elevation view of a cover.

FIG. 15 is a plan view of a puller plate.

FIG. 16 is an enlarged view similar to FIG. 2, with parts in section and parts removed for clarity, showing the stripper in the ready position.

FIG. 17 is similar to FIG. 16, showing the blades closed and about to begin sliding.

FIG. 18 is similar to FIG. 16, showing the stripper in the retract position.

FIG. 19 is similar to FIG. 16, showing the blades open and about to slide back to the ready position.

DETAILED DESCRIPTION OF THE INVENTION

The features of the end stripper 10 of the present invention are illustrated in FIGS. 1-3. The wire stripper includes a four-way valve 12. A bracket 14 is mounted to the side of the valve 12 by bolts 16. A handle 18 is pivoted to the bracket by pin 20. Actuation of the handle 18 depresses the stem 22 of a valve spool disposed in the valve body. Details of the valve and spool will be described below. An exhaust muffler 24 extends from the end face of the valve 12.

A pair of mounting bolts 26 extend through the valve's body, connecting it to an air cylinder 28. The joint between the valve body and air cylinder is sealed by an 0-ring 30. Looking at FIG. 3, the air cylinder has a piston 32 movable within a cavity 34 in the cylinder. The piston separates the cavity 34 into a front chamber 34A and a rear chamber 34B. The piston is sealed against the cavity wall by cup seals 36. A piston rod 38 is connected to the piston and extends out of the air cylinder through appropriate sealing or packing, which includes an 0-ring 40, a bushing 42 and a retaining ring 44.

The air cylinder 28 is connected to a stripper housing. The housing includes two frame members 46 which are connected to the air cylinder 28 by screws 48. The housing is completed by right and left covers 50 and 52, respectively. The covers are attached to the frame members by screws 54.

Each frame member 46 carries a ball plunger plate 56, which is attached by screws 58. The ball plunger plates have a pair of detents 60 drilled therein. The plates 56 cover elongated slots or openings 62 (FIG. 3) formed in the frame members 46.

The forward or right-most ends of the frame members 46 form a pair of fingers 64 separated by a notch 66. The fingers mount a wire guide 68 which extends from one frame to the other. The wire guide has a plurality of funnel-shaped openings 70 which direct wires inserted into the end of the wire stripper to the proper location opposite the cutting blades. The fingers also mount a pair of grippers 72 on shafts 74. The grippers are biased toward one another by springs 76 (FIG. 1) which react against pins 78. The pins 78 are held in the side frame fingers 64.

The end of the housing in the vicinity of the fingers 64 is enclosed by a guard 80 which is affixed to the right and left covers 50, 52 by screws 82. As seen in FIGS. 1 and 2, the guard comprises four generally U-shaped ribs joined at their ends. The ribs leave open spaces or apertures between them which allow insulation slugs to fall out of the housing. Also, it will be noted in FIG. 2 that the outer ribs of the guard cover the ends of the pins 74 and 78. The guard is the only thing holding those pins in the holes in the fingers 64. If the guard is removed, pins 74 and 78 will fall out, either by gravity or vibration of the stripper. This arrangement will defeat any attempt to operate the stripper with the guard removed, thereby assuring that the guard will always be in place. This affords an extra measure of safety.

Turning now to some of the interior components of the wire stripper, a connecting rod 84 extends through the end of the piston rod 38. The ends of the connecting rod fit into holes in a pair of puller plates 86. The puller plates are slidable within the housing, along the frame members 46. Each puller plate has a pair of slots 88 cut therein (see also FIG. 15). The slots are disposed at an angle to the longitudinal direction of sliding motion of the plate. A notch 90 divides the right-hand portion of the puller plates into a pair of legs 92.

A pivot pin 94 extends across the housing, in the notches 90 of the puller plates. The pivot pin is hollow and has an interior spring 96 urging a pair of ball plungers 98 outwardly of the pin. The ball plungers 98 are engageable with the detents 60 of the ball plunger plates 56. Under conditions which will be described below, the pivot pin 94 is slidable from the ready position shown in FIG. 16 to a retract position, FIG. 18, wherein the ball plungers engage the other set of detents 60. The pivot pin has a pair of flats 99 (see FIG. 16) which engage the slots 62 in the frames 46 to guide its sliding motion. The pivot pin 94 extends between the legs 92 of the puller plates.

The pivot pin 94 mounts a pair of blade holders, one of which is shown generally at 100. Each blade holder has a hub 102 through which the pivot pin 94 fits. The blade holders are pivotable about the pin 94 between an open condition and a closed condition. The blade holders are also slidable with the pivot pin between ready and retract positions. A set of cutting blades 104 is mounted on the blade holders, one-half of the set being mounted on each of the holders. An adjustable wire stop 106 is mounted to one of the blade holders by a screw 108 (FIG. 1).

Slide pins 110 fit through an opening in the blade holders and are slidable in the slots 88 of the puller plates. The slide pins are pivotable in the blade holders.

Details of the blade holders 100 are shown in FIGS. 8-11. The two blade holders are identical, so only one will be described in detail. As mentioned above, the blade holder has a hub 102 with a bore 112 extending therethrough. The bore accepts the pivot pin 94. A lever arm portion 114 extends from the hub. It has an indentation 116 and a bore 118 which accepts the slide pins 110. An extension portion 120 has a slot 122 for mounting the wire stop 106. The extension 120 terminates with a blade mounting portion including a locating flange 124 and mounting holes 126. The mounting holes 126 accept screws 128 (FIG. 11) which secure the blades 104 to the blade holder. It will be noted that the hub 102 is one-half of the height of the rest of the blade holder and is offset from the main axis of the lever arm 114 and extension 120. This permits two of the blade holders to be mated together, with their hubs aligned and flanges 124 facing each other to mount the blade set halves 104 in cooperating, opposing relation. The blade halves each have semi-circular notches 129 precisely sized for various wire gauges to cut the insulation without nicking the conductor of the wire. When the blade halves are brought together, the notches 129 combine with the mating set to sever the insulation, preparing it for removal.

A frame member 46 is shown separately in FIG. 12. The frame member includes screw holes 61 for screws 48. Holes 63 accept screws 54. Ball plunger plate screws 58 fit into holes 65. The screws mounting the wire guide fit into holes 67. The gripper mounting shafts 74 rest in openings 69. And spring pins 78 rest in openings 71.

Details of the covers 50, 52 are shown in FIGS. 13 and 14. Both covers are identical so only one will be described. Each cover has a flat, outer surface 49. The inner surface has a pair of indentations 51, separated by ledges 53. The front indentation 51 provides clearance for the pivoting motion of the blade holders. The ledges 53 provide a thickened portion which accepts screw holes 55. These holes mate with the holes 63 in the frame members 46 so that screws 54 can join the covers and frames. A hole 57 takes the screw 82 for mounting the guard 80.

FIG. 15 illustrates one of the puller plates 86. This clearly shows the angled slots 88 which, in conjunction with the slide pins 110, bring about the pivoting of the blade holders. The slots 88 are angled with respect to the puller plate's axis of sliding motion, which coincides with the longitudinal axis of the plate. A socket 87 receives the connecting rod 84.

Details of the four-way valve 12 are shown in FIGS. 4-7. The valve has a body member 130 which is drilled and plugged as necessary to form the various valve passages. The body includes a central chamber 132 into which fits a valve spool 134. The stem 22 is integral with the spool 134 and extends out of the valve body and into contact with the underside of the handle 18. The spool has a plurality of flanges which mount 0-ring seals 136A-E. The seals are engageable with the walls of the valve chamber 132, except where a seal is opposite a pocket 138A-E. A spring 140 is positioned in the bottom of the chamber 132. The spring biases the spool 134 outwardly of the chamber 132. Seal 136A isolates the chamber 132 from the exterior of the valve.

The passages in the valve include an inlet socket 142 which can be used to mount a fitting from an air pressure supply line (not shown). A similar socket 144 is provided for mounting the muffler 24 which reduces the noise of air venting from the valve. An air inlet 146 connects the inlet socket 142 to pocket 138C. A passage 148 connects pocket 138D to rear chamber 34B of the air cylinder 28. A passage 150 is formed in the cylinder 28 and extends to the front end of the cylinder. It communicates with the chamber 34A through a passage drilled at 152 (FIGS. 1 and 4). This passage is appropriately plugged to the atmosphere. Passage 150 also communicates with port 154 in the valve body 130. The connection between passage 150 and port 154 is sealed at 156. Port 154 communicates with pocket 138B through ducts 158 and 160.

An exhaust port 162 communicates with the exhaust socket 144. It is also connected to pockets 138A and 138E through ducts 164, 166 and 168. As mentioned above, the valve ducts are appropriately sealed or plugged at 170.

The use, operation and function of the wire stripper are as follows. Consider first just the operation of the four-way valve. In the ready position the handle 18 is unactuated and the valve spool 134 is in the position shown in FIG. 5. In this position, air pressure is supplied through inlet 146, through pockets 138C and 138D to passage 148 and rear chamber 34B. Seal 136C prevents inlet air from reaching pocket 138B. Similarly, forward chamber 34A is vented through passage 150, port 154, ducts 158, 160, pockets 138B, 138A, duct 164 and vent passage 162. Again, seal 136C prevents leakage between the exhaust air in pocket 138B and the inlet air in pocket 138C. With this arrangement of the air supply, the piston is moved to its forward or ready position.

Upon actuation of the handle, the stem 22 pushes the spool 134 into the chamber 132. This changes the relationship of the seals 136 with respect to the pockets 138. In the actuated position, seal 136D prevents inlet air flow to pocket 138D, while seal 136C opens air flow to pocket 138B. From pocket 138B, inlet air flows through ducts 160 and 158, through port 154 and passage 150, to the forward chamber 34A. This moves the piston rearwardly toward the retract position. During this motion the cylinder chamber 34B is vented through passage 148, pockets 138D and 138E (which has been opened by the movement of seal 136E into the pocket 138E) and out through ducts 168, 166, to the vent duct 162. When the handle 18 is released, the spring 140 drives the spool back to its original position, thereby reversing the air flow and moving the piston forwardly again. In any event, it can be seen that the piston is driven positively in both directions.

The operation of the rest of the wire stripper is illustrated in FIGS. 16-19. In FIG. 16, the rear cylinder chamber 34B is pressurized and the piston is in the fully forward or ready position The blade holders 100 are in the open condition and the ready position. The legs 92 of the puller plates 86 engage the grippers 72 and bias them to a separated, open condition. To strip a wire, a user inserts the wire through a wire-receiving opening 172 in the guard 80. The wire is pushed through an opening 70 in the wire guide 68, past the open blades 104 until it hits the wire stop 106.

The operator then depresses the handle 18 and the following takes place. As described above, the valve 12 reverses the air supply so that pressurized air is supplied to the chamber 34A while chamber 34B is vented. This moves the piston backwardly or to the left in FIGS. 16-19. As the piston moves to the left, the piston rod 38 will move the puller plates 86 to the left. As the puller plates move rearwardly, the legs 92 disengage the grippers 72, allowing them to close under the force of the gripper springs 76 and grasp the wire. Upon the initial movement of the puller plates, the blade holders 100 do not move with the plate 86 because the blade holders are retained in the ready position by virtue of the frictional engagement of the ball plungers 98 in the detents 60. Thus, there is a relative sliding between the puller plates 86 and the blade holders 100. Due to the engagement of the slide pins 110 in the puller plate slots 88, and the angled relationship o the slots 88 with respect to the direction of motion, the blade holders 100 are caused to pivot about the pivot pin 94 to a closed condition, as illustrated in FIG. 17. As the blades 104 close on the wire, they cut the insulation. Once the blades are closed, further pivoting motion of the blade holders is not possible. So the slide pins 110 become locked in the slots 88. At this point, the frictional engagement of the ball plungers in the detents is overcome and the blade holders and pivot pin slide with the puller plates. The sliding of the blade holders pulls the insulation slug off of the wire.

When the puller plates and blade holders reach the fully retracted position, the ball plungers will engage the inside or left-most set of detents 60. FIG. 18 shows the wire stripper in the retract position. The blades are still in the closed condition. The insulation slug has been removed and the wire stripper is ready to release the wire. At this point it is imperative that the blades open before moving back to the ready position so that they do not smash the wire as they move to the right or forwardly. When the operator releases the handle, the valve will cause the piston to move forwardly, thereby moving the puller plates forwardly. But the blade holders 100 do not immediately start to slide with the puller plates. Instead, there is again a relative sliding motion between the moving puller plates 86 and the stationary blade holders 100. By virtue of the engagement of the slide pins 110 with the angled slots 88, the blade holders will pivot from their closed condition to the open condition during the initial motion of the puller plates. When the slide pins 110 bottom against the left or inner ends of the slots 88, the frictional engagement of the ball plungers in the detents is overcome and the open blades will move with the puller plates. This condition is shown in FIG. 19. The open blades 104 will not engage the stripped wire as the puller plates and blade holders move as a unit forwardly. When the legs 92 hit the grippers 72, the legs will open the grippers to release the finished wire.

It can be seen that the described wire stripper is an end stripper in which precision blades can be used. A linear stripping motion is provided so that conductors will not be bent or nicked. It is a hand-held unit suitable for production work on form boards and the like.

While a preferred embodiment of the invention has been shown and described, it will be understood that modifications may be made thereto without departing from the scope of the following claims.

We claim:

1. A powered wire stripper, comprising:
   a housing including first and second frame members and right and left covers, and having at least one wire-receiving opening at one end for receiving wire to be stripped;
   a cylinder connected to the housing and having a piston movable therein with a piston rod connected to the piston extending from the cylinder to the housing;
   a valve for supplying pressure fluid to the cylinder on either side of the piston;
   a pair of blade holders pivotable about at least one pivot pin between open and closed conditions, the blade holders and pivot pin being slidable in the housing between ready and retract positions;
   first and second blades mounted in opposing relation on the blade holders and cooperating when the blade holders are closed to cut the insulation of a wire inserted into the wire-receiving opening;
   at least one puller plate which is connected to the piston rod and slidable in the housing along a longitudinal axis, the puller plate having a pair of slots therein disposed at an angle to the longitudinal axis; and
   a pair of slide pins slidably mounted in the slots of the puller plate and pivotally engaging the blade holders such that longitudinal motion of the puller plate causes the blade holders to pivot about the pivot pin.

2. The wire stripper of claim 1 wherein the housing has first and second detents formed therein and the pivot pin includes a ball plunger on at least one end, engageable with the first and second detents when the blade holders are located at their ready and retract positions, respectively, such that the blade holders are retained at one of said positions upon commencement of sliding motion of the puller plate toward the opposite position, the blade holders being restrained from sliding until the blade holders have pivoted from one condition to the other at which point the ball plunger releases the detent to allow sliding motion of the blade holders.

3. The wire stripper of claim 1 further characterized in that there are first and second puller plates.

4. The wire stripper of claim 1 further characterized in that the blade holders are mounted on a common pivot pin.

5. The wire stripper of claim 1 further comprising a pair of opposing grippers mounted in the housing near the wire-receiving opening, the grippers being pivotable between an open condition wherein wires to be stripped can be admitted to the stripper and a closed condition wherein an admitted wire is firmly clamped for cutting and removing an insulation slug.

6. The wire stripper of claim 5 wherein the grippers are spring-biased to the closed condition, and the puller plate has a pair of legs engageable with the grippers to open them when the puller plate is at or near the ready position.

7. The wire stripper of claim 5 further comprising a guard covering the wire-receiving opening, the guard having apertures large enough to admit wires but not foreign objects, and wherein the grippers are pivoted on shafts retained by the guard.

8. The wire stripper of claim 1 further comprising a guard covering the wire-receiving opening, the guard having apertures large enough to admit wires but not foreign objects.

9. The wire stripper of claim 1 further comprising a wire guide mounted in the housing and having a plurality of apertures aligned with the blades to guide wires to be stripped to the appropriate position relative to the blades.

10. The wire stripper of claim 1 further comprising a wire stop attached to a blade holder behind the blades to control the length of the insulation slugs.

11. A powered wire stripper, comprising:
  a housing including first and second frame members and right and left covers and having at least one wire-receiving opening at one end for receiving wire to be stripped;
  a cylinder connected to the housing and having a piston movable therein with a piston rod connected to the piston extending from the cylinder to the housing;
  a valve for supplying pressure fluid to the cylinder on either side of the piston;
  a pair of blade holders movable between open and closed conditions, the blade holders being slidable in the housing between ready and retract positions;
  first and second blades mounted in opposing relation on the blade holders and cooperating when the blade holders are closed to cut the insulation of a wire inserted into the wire-receiving opening;
  actuator means connected to the piston rod for moving the blade holders from one condition to the other when the piston commences motion in one direction and thereafter sliding the blade holders from one position to the other upon continued motion of the piston in that direction; and
  retention means for positively, releasably retaining the blade holders in said one position until the actuator means has changed the blade holders condition.

12. The wire stripper of claim 11 further comprising at least one pivot pin about which the blade holders are pivotable, and wherein the actuator means comprises:
  at least one puller plate which is connected to the piston rod and slidable in the housing along a longitudinal axis, the puller plate having a pair of slots therein disposed at an angle to the longitudinal axis; and
  a pair of slide pins slidably mounted in the slots of the puller plate and pivotally engaging the blade holders such that longitudinal motion of the puller plate causes the blade holders to pivot about the pivot pin.

13. The wire stripper of claim 12 wherein the retention means comprises first and second detents formed in the housing and a ball plunger on at least one end of the pivot pin, engageable with the first and second detents when the blade holders are located at their ready and retract positions, respectively, such that the blade holders are retained at one of said positions upon commencement of sliding motion of the puller plate toward the opposite position, the blade holders being restrained from sliding until the blade holders have pivoted from one condition to the other at which point the ball plunger releases the detent to allow sliding motion of the blade holders.

14. The wire stripper of claim 12 further comprising a pair of opposing grippers mounted in the housing near the wire-receiving opening, the grippers being pivotable between an open condition wherein wires to be stripped can be admitted to the stripper and a closed condition wherein an admitted wire is firmly clamped for cutting and removing an insulation slug.

15. The wire stripper of claim 14 wherein the grippers are spring-biased to the closed condition, and the puller plate has a pair of legs engageable with the grippers to open them when the puller plate is at or near the ready position.

16. The wire stripper of claim 15 further comprising a guard covering the wire-receiving opening, the guard having apertures large enough to admit wires but not foreign objects, and wherein the grippers are pivoted on shafts retained by the guard.

17. The wire stripper of claim 11 further comprising a pair of opposing grippers mounted in the frame near the wire-receiving opening, the grippers being pivotable between an open condition wherein wires to be stripped can be admitted to the stripper and a closed condition wherein an admitted wire is firmly clamped for cutting and removing an insulation slug.

18. The wire stripper of claim 17 further comprising a guard covering the wire-receiving opening, the guard having apertures large enough to admit wires but not foreign objects, and wherein the grippers are pivoted on shafts retained by the guard.

19. The wire stripper of claim 11 further comprising a guard covering the wire-receiving opening, the guard having apertures large enough to admit wires but not foreign objects.

* * * * *